(12) United States Patent
Booth et al.

(10) Patent No.: US 10,611,279 B2
(45) Date of Patent: Apr. 7, 2020

(54) OCCUPANT SUPPORT SYSTEM FOR A PASSENGER VEHICLE SEAT

(71) Applicant: GM GLOBAL TECHNOLOGY OPERATIONS LLC, Detroit, MI (US)

(72) Inventors: Daniel W. Booth, Troy, MI (US); Stephanie C. Radion, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/007,386

(22) Filed: Jun. 13, 2018

(65) Prior Publication Data
US 2019/0381918 A1    Dec. 19, 2019

(51) Int. Cl.
*B60N 2/66* (2006.01)
*B60N 2/90* (2018.01)

(52) U.S. Cl.
CPC ............. *B60N 2/665* (2015.04); *B60N 2/914* (2018.02)

(58) Field of Classification Search
CPC ................................. B60N 2/665; B60N 2/914
USPC ...... 297/284.3, 284.4, 284.6, 452.41, DIG. 3
See application file for complete search history.

(56) References Cited

U.S. PATENT DOCUMENTS

| 3,680,918 | A | * | 8/1972 | Briggs | A47C 1/16 297/452.41 |
|---|---|---|---|---|---|
| 4,491,364 | A | | 1/1985 | Hattori et al. | |
| 4,497,517 | A | * | 2/1985 | Gmeiner | A47C 7/425 297/284.6 |
| 4,655,505 | A | * | 4/1987 | Kashiwamura | A47C 7/467 297/284.6 |
| 4,833,614 | A | * | 5/1989 | Saitoh | B60N 2/0224 297/284.6 X |
| 5,113,540 | A | * | 5/1992 | Sereboff | A47C 7/021 297/452.41 |
| 5,127,708 | A | * | 7/1992 | Kishi | A61B 5/18 297/284.6 X |
| 5,129,704 | A | * | 7/1992 | Kishi | B60N 2/0224 297/284.6 X |
| 5,263,765 | A | * | 11/1993 | Nagashima | A47C 7/467 297/284.6 |
| 5,558,398 | A | * | 9/1996 | Santos | A47C 4/54 297/284.3 |
| 5,562,324 | A | * | 10/1996 | Massara | B60N 2/665 297/284.6 |
| 5,658,050 | A | * | 8/1997 | Lorbiecki | B62J 1/12 297/452.41 |
| 5,662,384 | A | * | 9/1997 | O'Neill | A47C 4/54 297/284.6 |
| 5,678,891 | A | * | 10/1997 | O'Neill | A47C 4/54 297/284.3 |
| 5,860,699 | A | * | 1/1999 | Weeks | A47C 7/467 297/284.3 X |
| 5,893,609 | A | | 4/1999 | Schmidt | |
| 6,088,643 | A | * | 7/2000 | Long | A47C 4/54 297/284.3 X |
| 6,098,000 | A | * | 8/2000 | Long | A47C 4/54 297/284.6 X |

(Continued)

*Primary Examiner* — Rodney B White

(57) ABSTRACT

An occupant support system for a vehicle passenger seat includes an air bladder with a first portion having a first flexibility and defining a first pressure adaptive volume, and a second portion having a second flexibility and defining a second pressure adaptive volume, wherein the first flexibility is lower than the second flexibility.

5 Claims, 4 Drawing Sheets

(56) References Cited

U.S. PATENT DOCUMENTS

| | | | | |
|---|---|---|---|---|
| 6,129,419 A | * | 10/2000 | Neale | B60N 2/58 297/284.4 |
| 6,203,105 B1 | * | 3/2001 | Rhodes, Jr. | A47C 4/54 297/284.6 |
| 6,384,715 B1 | * | 5/2002 | Potter | A47C 7/467 340/407.1 |
| 6,422,087 B1 | * | 7/2002 | Potter | B60N 2/0232 73/731 |
| 6,497,454 B1 | * | 12/2002 | Davidsson | B60N 2/99 297/284.3 |
| 7,059,678 B1 | * | 6/2006 | Taylor | A47C 7/405 297/284.4 |
| 7,093,898 B2 | * | 8/2006 | Ladron De Guevara | A47C 4/54 297/284.6 |
| 7,621,596 B2 | | 11/2009 | Petzel | |
| 8,678,500 B2 | * | 3/2014 | Lem | B60N 2/914 297/284.6 |
| 8,827,371 B2 | | 9/2014 | Brncick et al. | |
| 9,211,824 B2 | | 12/2015 | Arant et al. | |
| 9,278,633 B2 | | 3/2016 | Brncick et al. | |
| 9,505,322 B2 | | 11/2016 | Hosbach et al. | |
| 9,663,000 B2 | | 5/2017 | Kolich et al. | |
| 9,682,640 B2 | | 6/2017 | Dry | |
| 9,777,753 B2 | | 10/2017 | Niiyama et al. | |
| 9,937,826 B2 | | 4/2018 | Dry | |
| 9,949,568 B2 | | 4/2018 | Zouzal et al. | |
| 9,981,577 B2 | | 5/2018 | Zouzal et al. | |
| 2002/0180249 A1 | * | 12/2002 | Felton | A47C 7/14 297/284.6 |
| 2003/0038517 A1 | * | 2/2003 | Moran | B60N 2/914 297/284.3 |
| 2005/0082895 A1 | * | 4/2005 | Kimmig | A47C 7/467 297/452.41 |
| 2009/0152916 A1 | * | 6/2009 | Lin | A47C 1/032 297/284.4 X |
| 2009/0224587 A1 | | 9/2009 | Lawall et al. | |
| 2011/0227388 A1 | * | 9/2011 | Bocsanyi | B60N 2/914 297/452.41 |
| 2012/0143108 A1 | * | 6/2012 | Bocsanyi | F15B 13/081 297/284.3 X |
| 2014/0232155 A1 | * | 8/2014 | Bocsanyi | A47C 4/54 297/284.6 |
| 2016/0157617 A1 | * | 6/2016 | Galbreath | A47C 7/467 297/452.41 |
| 2016/0229320 A1 | * | 8/2016 | Lem | A61H 9/0078 |
| 2018/0072199 A1 | * | 3/2018 | Strumolo | B60N 2/99 |
| 2018/0355991 A1 | * | 12/2018 | Pfahler | F16K 31/025 |
| 2018/0361897 A1 | * | 12/2018 | Lem | B60N 2/665 |

\* cited by examiner

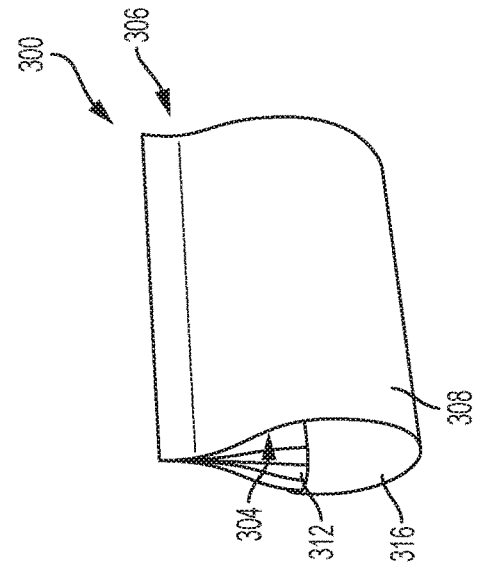
FIG. 3B
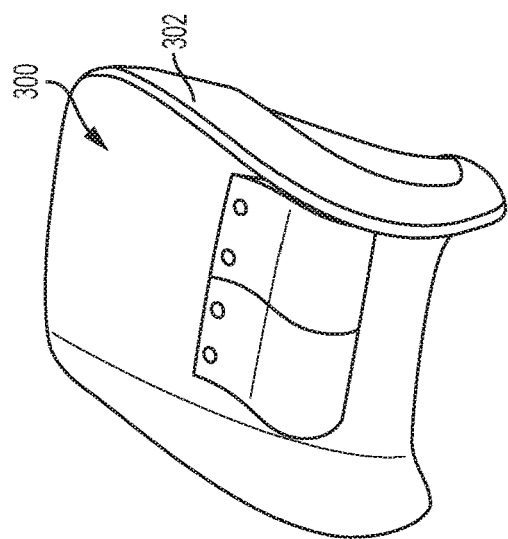
FIG. 3A
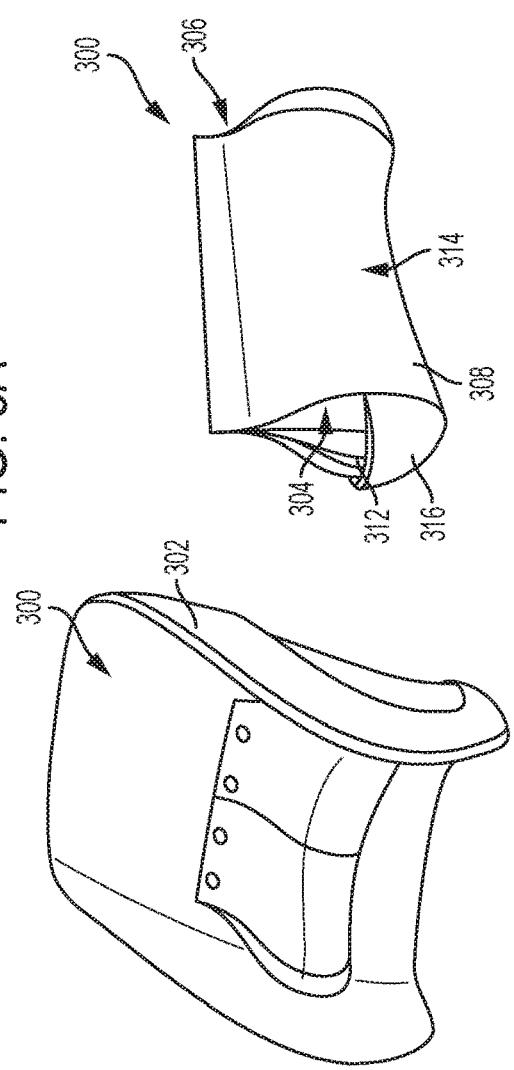
FIG. 3E
FIG. 3D
FIG. 3C
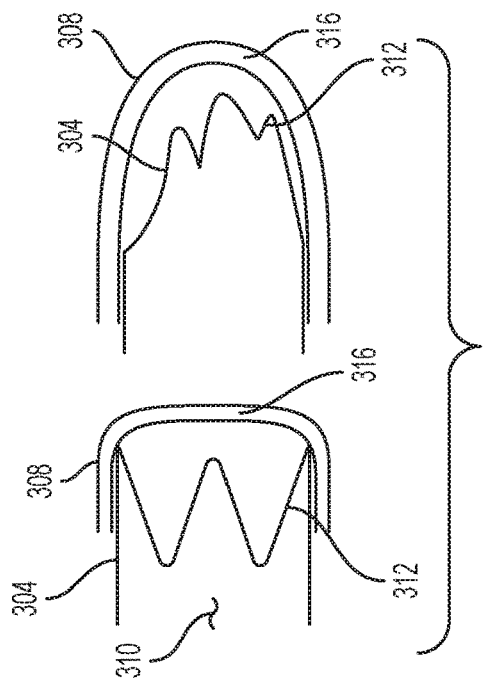

OCCUPANT SUPPORT SYSTEM FOR A PASSENGER VEHICLE SEAT

FIELD

The present disclosure relates to an occupant support system for a passenger vehicle seat.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Passenger vehicle seats may incorporate a variety of support systems. These support systems provide support to an occupant and are generally adapted to provide comfortable support to the occupant. Many of these support systems are adjustable by the occupant to provide the amount of support and comfort that is desired by the occupant. Many conventional passenger vehicle seat occupant support systems may include adjustments which are mechanical, electro/mechanical, pneumatic, hydraulic, manual, and/or any combination of these. One example of a pneumatically adjustable passenger vehicle occupant support system may be a pneumatic system that has an air bladder in communication with an air pump via an air channel and an air release valve. With this type of system, an occupant may adjust the amount of support provided by this system by selectively operating the air pump to add air to the bladder and/or the air release valve to release air from the bladder.

Pneumatically adjustable passenger vehicle occupant systems which incorporate air bladders may suffer from a number of problems. There are situations in which the capacity of the air bladder may be exceeded. These conventional air bladder systems have a limited volume and any attempt to add air to the system when the maximum volume has been reached may risk damage to the bladder. For example, an occupant may operate the air pump and attempt to add air to the air bladder when the air bladder has reached a maximum volume.

In another exemplary situation, even though the maximum volume of the air bladder may not have been reached when an occupant operates an air pump at a given temperature range, any increase of temperature correspondingly increases the volume of the air within the air bladder. If the temperature reaches a point at which the air contained within the air bladder has a volume which equals and/or exceeds the maximum volume capacity of the air bladder, then damage to the air bladder may result. To avoid and/or reduce damage to the air bladder, these systems may incorporate an air release valve which opens and releases air from the bladder when a predetermined pressure has been reached. In this manner, damage to the air bladder may be eliminated and/or reduced.

In yet another exemplary condition, even when the maximum volume of the air bladder might not have been reached, the pressure within the air bladder may reach or exceed a maximum pressure before damage to the air bladder may occur and/or cause a loss of air mass from the system via a pressure triggered air release valve. Such a condition may exist when an occupant "jounces" in the seat which may occur in response to acceleration forces during dynamically varying conditions in the vehicle. An occupant jounce in the vehicle seat may increase the force that the occupant applies to the occupant support system and, as a result, increase the pressure within an air bladder which may exceed a maximum pressure capacity of that system.

Conventional pneumatically adjustable passenger vehicle occupant systems may suffer from additional problems. For example, a vehicle occupant may adjust the system to include a volume of air which is preferred by that occupant. The volume of the air enclosed within the air bladder is necessarily temperature dependent and any increase of temperature may cause an undesirable increase in volume of that air. If the vehicle occupant adjusts the system such that the volume may approach the maximum volume of the air bladder, the occupant may leave the vehicle, unoccupied, in an environment having a higher temperature which may result in the volume of air in the air bladder exceeding the maximum volume of the air bladder. In the absence of a relief valve, the air bladder may become damaged. Alternatively, in the presence of a relief valve, which permits air mass to escape from the bladder when the volume of air exceeds the maximum volume of the air bladder, when the temperature is reduced and the occupant returns to the vehicle, the air bladder system now has a lower volume than what was previously set by the occupant. This is undesirable as the occupant is then forced to re-adjust the system to return to the configuration which is preferred by that occupant.

One attempt to address these problems has resulted in a pneumatically adjustable passenger vehicle occupant system which may include a pressure sensor along with a control system which operates the air pump to maintain an occupant set pressure. However, even with these systems, the volume of the air within the air bladder is not directly controlled such that an occupant preferred volume is maintained while also ensuring that the volume does not exceed the maximum volume of the air bladder system. Further, the addition of sensors and controls increases the complexity and cost, and the cycling of the pump which reduces reliability and durability. A solution to these and other problems is clearly needed.

SUMMARY

In an exemplary aspect, an occupant support system for a vehicle passenger includes an air bladder with a first portion having a first flexibility and defining a first pressure adaptive volume, and a second portion having a second flexibility and defining a second pressure adaptive volume, wherein the first flexibility is lower than the second flexibility.

In this manner, an air bladder in an occupant support system is able to minimize and/or eliminate the risk of damage due to an over pressure in the bladder while also avoiding a loss of air mass and, thereby, maintaining an ability to return to and/or maintain an occupant preferred shape or configuration when the over pressure condition ceases. Further, the cost, reliability, durability and complexity is improved by obviating and/or reducing the necessity for an air pump to return air into the air bladder and of any associated sensors as may have been included in previous systems. Additionally, the occupant support system of the present disclosure improves a vehicle occupant experience while reducing maintenance and/or warranty issues and enabling a thinner seat due to the reduced space required by the inventive occupant support system.

In another exemplary aspect, the first pressure adaptive volume varies across a first range of pressures and the second pressure adaptive volume varies across a second range of pressures.

In another exemplary aspect, the first range of pressures is lower than the second range of pressures.

In another exemplary aspect, the first range of pressures and the second range of pressures do not overlap.

In another exemplary aspect, the first portion comprises an occupant facing surface.

In another exemplary aspect, the first pressure adaptive volume is centrally positioned in a lumbar section of the vehicle passenger seat.

In another exemplary aspect, the first flexibility corresponds to a first elasticity and the second flexibility corresponds to a second elasticity and wherein the first elasticity is lower than the second elasticity.

In another exemplary aspect, the air bladder includes an inner layer that includes a first wall portion in the first portion and a second wall portion in the second portion, wherein the second wall portion comprises a plurality of folds, and an outer layer that includes a rigid section in the first portion and a flexible section in the second portion.

In another exemplary aspect, the air bladder further includes a valve between the first portion and the second portion that is responsive to permit a flow of air from the first pressure adaptive volume into the second pressure adaptive volume when a pressure within the first volume exceeds a predetermined pressure.

In another exemplary aspect, the valve further permits a flow of air from the second pressure adaptive volume into the first pressure adaptive volume when the pressure within the first pressure adaptive volume is below the predetermined pressure.

In another exemplary aspect, the second portion of the air bladder further includes a compression biasing spring.

In another exemplary aspect, the compression biasing spring is responsive to open and increase a volume of the second pressure adaptive volume when a pressure in the first pressure adaptive volume exceeds a predetermined pressure.

In another exemplary aspect, the compression biasing spring is responsive to close and decrease the volume of the second pressure adaptive volume when a pressure in the first pressure adaptive volume is below the predetermined pressure.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIG. 3A is a perspective view of an exemplary occupant support system in a first configuration;

FIG. 3B is another perspective view of the occupant support system of FIG. 3A in the first configuration;

FIG. 3C is a perspective view of the occupant support system of FIG. 3A in a second configuration;

FIG. 3D is another perspective view of the occupant support system of FIG. 3A in the second configuration;

FIG. 3E is a cross-sectional view of a portion of the occupant support system of FIG. 3A illustrating the transition between the first configuration and the second configuration;

DETAILED DESCRIPTION

Figure 1:
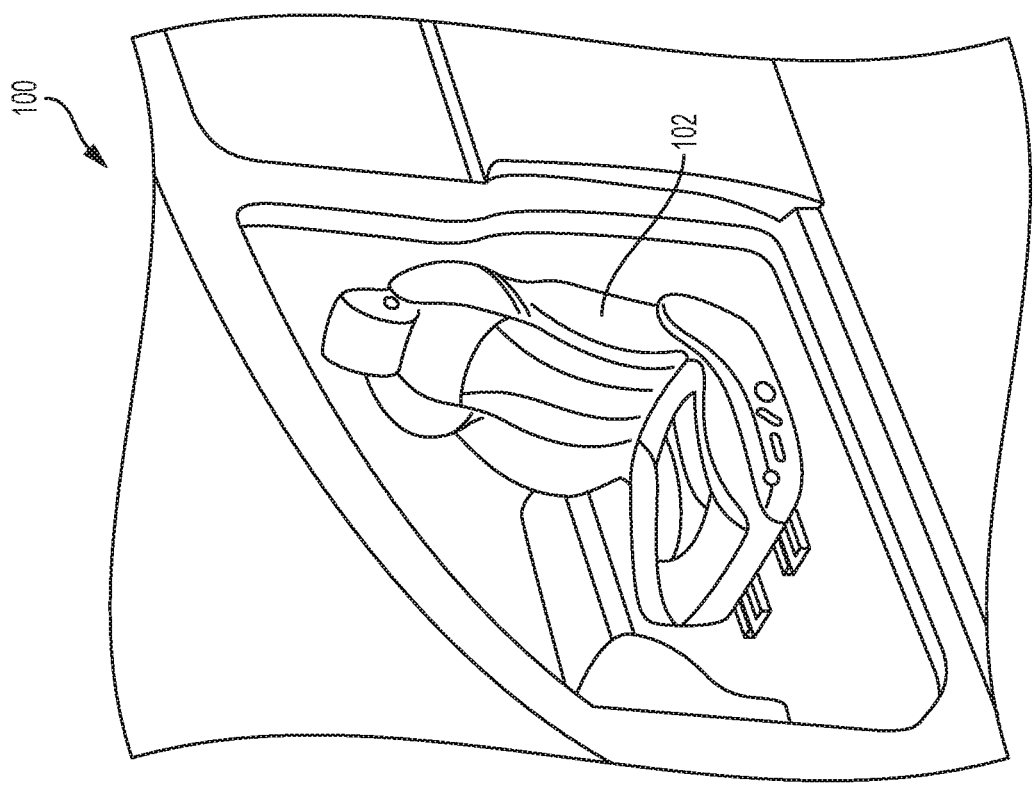
FIG. 1 is a partial perspective view of a vehicle with a vehicle passenger seat.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner. Referring now to the drawings, wherein like reference numbers correspond to like or similar components throughout the several figures, FIG. 1 is a partial perspective view of a vehicle 100 with a vehicle passenger seat 102 in accordance with an exemplary embodiment of the present disclosure. The vehicle passenger seat 102 is positioned in an interior compartment of the vehicle 100. The vehicle passenger seat 102 in the illustrated embodiment is positioned in a front row on a driver's side of the vehicle 100. However, it is to be understood that exemplary embodiments of the vehicle passenger seat 102 of the present disclosure may be positioned anywhere within the vehicle 100.

Figure 2:
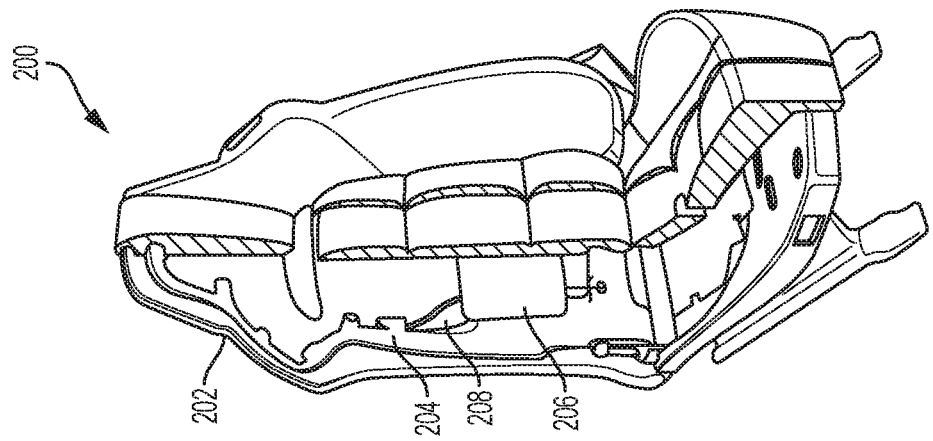
FIG. 2 is a cut-away perspective view of another exemplary vehicle passenger seat.

FIG. 2 is a cut-away perspective view of another exemplary vehicle passenger seat 200. The vehicle passenger seat 200 includes a support structure 202 to which is attached an air pump 204, an air bladder 206, and an air channel 208 connecting the air pump 204 to the air bladder 206. In the exemplary vehicle passenger seat 200, the air pump 204, air bladder 206 and air channel 208, together, form an occupant support system, which, in this case, provides support to a lumbar area. The detailed description of the present disclosure will generally describe occupant support systems which may form a lumbar support. However, it is to be understood that the occupant support system may form any type of occupant support in a vehicle passenger seat such as, for example, a side bolster, a lumbar support, a head rest, and the like without limitation.

Referring now to FIGS. 3A through 3E, an exemplary embodiment of an occupant support system 300 will be described. FIGS. 3A and 3C illustrate a support structure 302 for a vehicle passenger seat on which the occupant support system 300 is positioned. It is to be understood that the support structure 302 is schematically represented and may form a vehicle passenger seat support frame or the like without limitation. Additional optional features of the vehicle passenger seat, such as, for example cushions and the like are omitted for the purpose of clarity.

The exemplary occupant support system 300 includes an air bladder 306 with an inner layer 304 and an outer layer 308. The inner layer 304 of the bladder includes a first portion 310 defining a first pressure adaptive volume and a second portion 312 defining a second pressure adaptive volume. The first portion 310 is centrally located along a lumbar section of the passenger seat and defines a first pressure adaptive volume that has a volume that is responsive to and directly proportional to a pressure within the inner layer 304 across a first range of pressures. The second portion 312 includes a folded wall portion that defines a second pressure adaptive volume that is responsive to increase in volume when a pressure within the inner layer 304 exceeds a predetermined pressure that is higher than the first range of pressures. The second portion 312 is laterally positioned to the side of the vehicle passenger seat.

The outer layer 308 forms an outer supportive layer for the inner layer 304 and generally forms a pocket for supporting the inner layer and also for assisting in controlling the relative expansion and contraction between the first pressure adaptive volume and the second pressure adaptive volume. The outer layer 308 includes a relatively flexible yet inelastic material first section 314 (such as, for example, a fabric, leather, and/or the like) which surrounds the first portion 310 of the inner layer 304. The first section 314 of the outer layer 308 is flexible enough to permit the inner layer 304 to enclose a volume which is responsive to the pressure of air within the air bladder across the first range of pressures. When the first range of pressures is exceeded (i.e. exceeds a predetermined pressure), then the first section 314 of the outer layer 308 works together with the inner layer to prevent further expansion of the first pressure adaptive volume and also to protect the inner layer 304 from being damaged by the increased pressure. The outer layer 308 includes side sections 316 which have sufficient flexibility and/or elasticity to permit the folded walls of the second portion 312 of the inner layer 304 to start to unfold when the pressure of the air within the bladder exceeds the predetermined pressure. FIG. 3E illustrates the folded condition of the second portion 312 of the inner layer 304 and the shape of the side section(s) 316 of the outer layer 308 in solid lines. This condition corresponds to the pressure of the air in the bladder being lower than a predetermined pressure and/or falls within the first range of pressures which is lower than a second range of pressures. FIG. 3E also illustrates the unfolded condition of the second portion 312 of the inner layer 304 and the shape of the side section(s) 316 of the outer layer 308 in hidden lines. This condition corresponds to the pressure of the air in the bladder being higher than the predetermined pressure and/or falls within the second range of pressures which is higher than the first range of pressures.

Figure 4A:
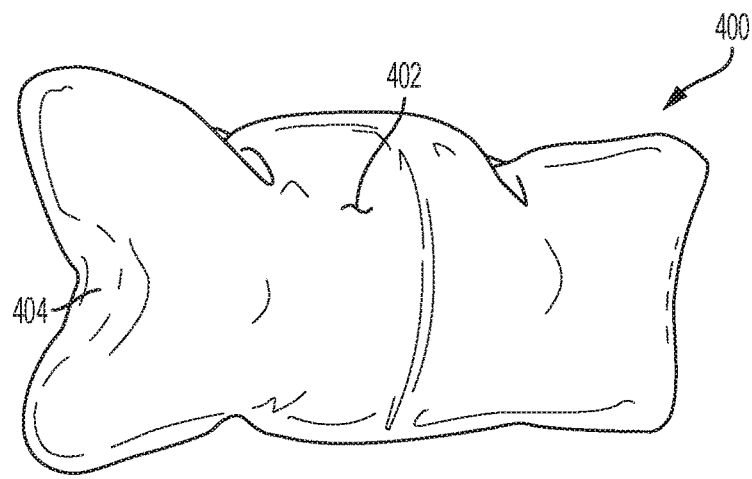
FIG. 4A is a perspective view of another exemplary occupant support system in a first configuration.
Figure 4B:
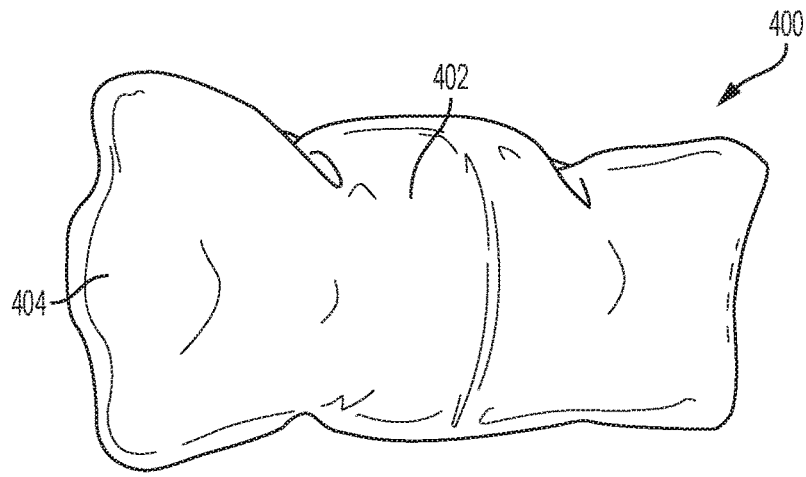
FIG. 4B is a perspective view of the occupant support system of FIG. 4A in a second configuration.

Referring now to FIGS. 4A and 4B, another exemplary embodiment of an occupant support system 400 for a vehicle passenger seat is illustrated. The occupant support system 400 forms an air bladder with a first portion 402 defining and enclosing a first pressure adaptive volume and a second portion 404 defining and enclosing a second pressure adaptive volume. The air bladder 400 may include materials that are co-molded during production of the bladder 400 to provide a variance in flexibility. The first portion 402 may have a first flexibility that is lower than a second flexibility of the second portion 404 across a first range of pressures. When a pressure of the air within the bladder 400 exceeds a predetermined pressure at the top of end of the first range of pressures, the first portion 402 may prevent further expansion of the first pressure adaptive volume and the second portion 404 of the bladder may then expand to permit an increase in volume in the second pressure adaptive volume across a second range of pressures that is higher than the first range of pressures. In reverse, as the pressure of the air within the bladder reduces, the volume in the second pressure adaptive volume decreases while the volume of the first pressure adaptive volume is maintained across the second range of pressures. Only when the air pressure within the air bladder reduces below the predetermined pressure and transitions from the second range of pressures into the first range of pressures, does the volume in the first pressure adaptive volume start to decrease.

Figure 5:
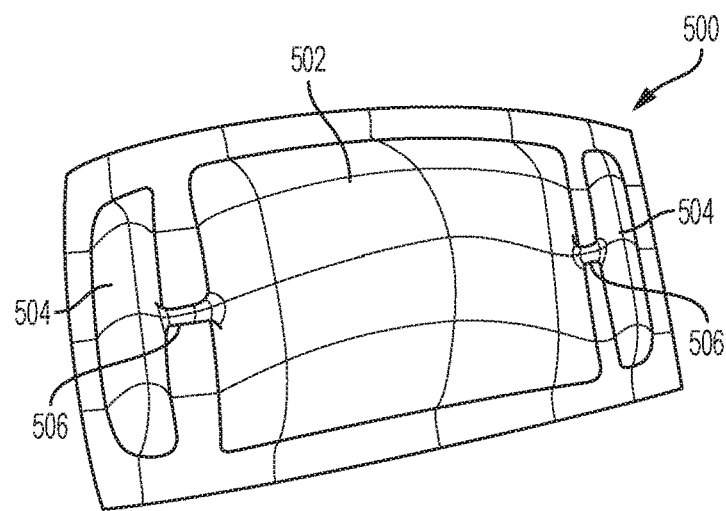
FIG. 5 is a perspective view of yet another exemplary occupant support system.

Referring now to FIG. 5, yet another occupant support system 500 in accordance with an exemplary embodiment of the present disclosure is illustrated in perspective view. The system 500 is characterized as including a first portion 502 having a first flexibility and defining a first pressure adaptive volume and second portions 504 each defining second pressure adaptive volumes. While the system 500 of FIG. 5 includes two second portions 504, it is to be understood that an occupant support system may include any number of second portions each defining a second pressure adaptive volume with limitation and remain within the scope of the present disclosure. The system 500 also includes valves 506 which are each positioned between the first portion 502 and corresponding second portions 504. Each of the valves 506 is responsive to permit a flow of air from the first pressure adaptive volume into the second pressure adaptive volume when a pressure within the first pressure adaptive volume exceeds a predetermined pressure. Further, each of the valves 506 permits a flow of air from the second pressure adaptive volume(s) into the first pressure adaptive volume when the pressure within the first pressure adaptive volume is below the predetermined pressure.

Figure 6A:
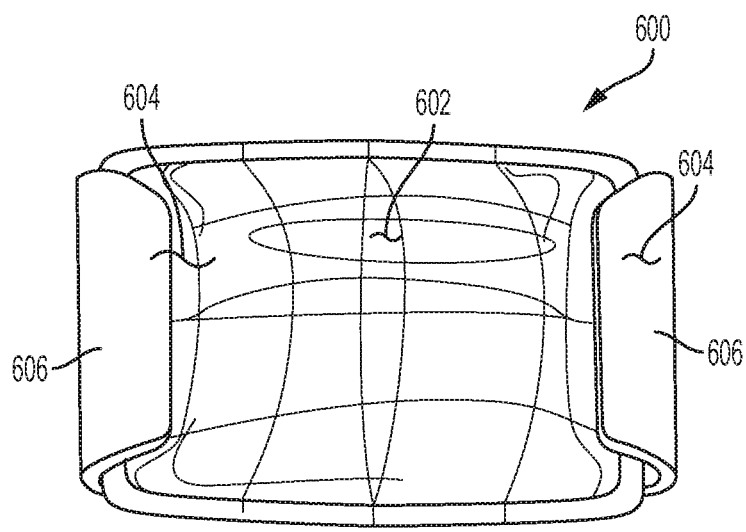
FIG. 6A is a perspective view of a further exemplary occupant support system.
Figure 6B:
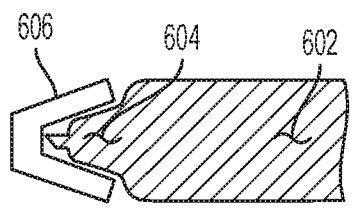
FIG. 6B is a cross-sectional close up view of a portion of the occupant support system of FIG. 6A.

FIGS. 6A and 6B illustrate another exemplary embodiment of an occupant support system 600 in accordance with the present disclosure. The system includes an air bladder having a first portion 602 defining a first pressure adaptive volume and a second portion 604 defining a second pressure adaptive volume. The second portion 604 includes a compression biasing spring 606 that encloses the second pressure adaptive volume. The compression biasing spring 606 is responsive to open and increase a volume of the second pressure adaptive volume when a pressure in the first pressure adaptive volume exceeds a predetermined pressure. The compression biasing spring is also responsive to close and decrease the volume of the second pressure adaptive volume when a pressure in the first pressure adaptive volume is below the predetermined pressure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An occupant support system for a vehicle passenger seat, the system including an air bladder that comprises:
    a first portion having a first flexibility and defining a first pressure adaptive volume; and
    a second portion having a second flexibility and defining a second pressure adaptive volume, wherein the first flexibility is lower than the second flexibility, wherein the air bladder comprises:

an inner layer that includes a first wall portion in the first portion and a second wall portion in the second portion, wherein the second wall portion comprises a plurality of folds;

an outer layer that includes a rigid section in the first portion and a flexible section in the second portion; and a valve between the first portion and the second portion that is responsive to permit a flow of air from the first pressure adaptive volume into the second pressure adaptive volume when a pressure within the first volume exceeds a predetermined pressure.

2. The system of claim 1, wherein the valve further permits a flow of air from the second pressure adaptive volume into the first pressure adaptive volume when the pressure within the first pressure adaptive volume is below the predetermined pressure.

3. An occupant support system for a vehicle passenger seat, the system including an air bladder that comprises:

a first portion having a first flexibility and defining a first pressure adaptive volume; and a second portion having a second flexibility and defining a second pressure adaptive volume, wherein the first flexibility is lower than the second flexibility, and wherein the air bladder comprises:

an inner layer that includes a first wall portion in the first portion and a second wall portion in the second portion, wherein the second wall portion comprises a plurality of folds; and an outer layer that includes a rigid section in the first portion and a flexible section in the second portion, wherein the second portion of the air bladder further comprises a compression biasing spring.

4. The system of claim 3, wherein the compression biasing spring is responsive to open and increase a volume of the second pressure adaptive volume when a pressure in the first pressure adaptive volume exceeds a predetermined pressure.

5. The system of claim 4, wherein the compression biasing spring is responsive to close and decrease the volume of the second pressure adaptive volume when a pressure in the first pressure adaptive volume is below the predetermined pressure.

* * * * *